US012780311B2

(12) United States Patent
Katsuda

(10) Patent No.: US 12,780,311 B2
(45) Date of Patent: Nov. 3, 2026

(54) CORRECTION DEVICE, STEERING HOLDING DETERMINATION DEVICE, AND CORRECTION METHOD

(71) Applicant: TOYOTA JIDOSHA KABUSHIKI KAISHA, Aichi (JP)

(72) Inventor: Hiroto Katsuda, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 29 days.

(21) Appl. No.: 18/948,488

(22) Filed: Nov. 15, 2024

(65) Prior Publication Data

US 2025/0162649 A1 May 22, 2025

(30) Foreign Application Priority Data

Nov. 21, 2023 (JP) ................................ 2023-197154

(51) Int. Cl.
*B62D 15/02* (2006.01)

(52) U.S. Cl.
CPC .................................. *B62D 15/025* (2013.01)

(58) Field of Classification Search
CPC .................................................... B62D 15/025
See application file for complete search history.

(56) References Cited

U.S. PATENT DOCUMENTS

2008/0097669 A1* 4/2008 Kasbarian ................ B62D 6/10 701/42
2017/0355397 A1* 12/2017 Watanabe .............. B62D 6/003
2021/0284235 A1 9/2021 Eguchi et al.
2023/0008327 A1* 1/2023 Larminy .................. B62D 6/10
2024/0343296 A1* 10/2024 Bhardwaj .............. B62D 1/286
2024/0375664 A1* 11/2024 Herman ................ B60W 40/08
2025/0136107 A1* 5/2025 Uemura ............... B62D 15/025

FOREIGN PATENT DOCUMENTS

JP 2018-172046 A 11/2018
JP 2020-117025 A 8/2020
JP 2021-142955 A 9/2021

* cited by examiner

*Primary Examiner* — Joseph J Dallo
(74) *Attorney, Agent, or Firm* — HAUPTMAN HAM, LLP

(57) ABSTRACT

To improve the accuracy of a torque sensor value, provided is a correction device for the steering torque sensor, comprising a traveling state determination unit determines whether or not, during activation of a lane trace assist control, the vehicle is in a specific traveling state, an operation state determination unit determines whether or not a driver is in a specific operation state, an estimation unit estimates a zero-point positional deviation amount of a sensor value of the steering torque sensor based on a center of an amplitude of the sensor value, when the vehicle is in the specific traveling state and the driver is in the specific operation state, and a correction unit corrects the sensor value or a threshold value used in the predetermined determination process using the sensor value based on the deviation amount estimated by the estimation unit.

13 Claims, 5 Drawing Sheets

CORRECTION DEVICE, STEERING HOLDING DETERMINATION DEVICE, AND CORRECTION METHOD

CROSS-REFERENCE TO RELATED APPLICATION

This application claims priority to Japanese Patent Application No. JP 2023-197154 filed on Nov. 21, 2023, the content of which is hereby incorporated by reference in its entirety into this application.

BACKGROUND OF THE INVENTION

1. Field of the Invention

The present disclosure relates to a correction device, a steering holding determination device, and a correction method, and particularly relates to a technique suitable for correction of a steering torque sensor.

2. Description of the Related Art

For example, Japanese Patent Application Laid-Open (kokai) No. 2021-142955 (hereinafter Patent Document 1) discloses a technique in which, in a vehicle capable of executing a Lane Trace Assist (hereinafter LTA), a corrected torque is obtained by removing a torque generated by a steering assistance from a detected result of a steering torque sensor, and whether a driver is in a steering wheel releasing state is determined based on the corrected torque.

It is assumed that a zero-point position of the steering torque sensor is such that the value at the center of the amplitude of the torque sensor value is 0 Nm. However, in many cases, the zero-point position is offset from the center point (0 Nm) toward a positive side or a negative side due to an influence of individual differences in the sensor, assembly errors, and the like. In the technique described in Patent Document 1, since the influence of individual differences and assembly errors of the sensors is not taken into consideration, there is a possibility that it is not possible to accurately determine whether the driver is in the steering wheel releasing state.

SUMMARY OF THE INVENTION

An object of the present disclosure is to improve the accuracy of a torque sensor value by effectively estimating a deviation amount of the zero-point position of the torque sensor value.

A device according to at least one embodiment of the present disclosure is a correction device for a steering torque sensor, comprising a traveling state determination unit configured to determine whether or not, during activation of a lane trace assist control for maintaining a vehicle in a traveling lane in which the vehicle is traveling, the vehicle is in a specific traveling state in which the lateral position of the vehicle is maintained near a predetermined target lateral position set in the traveling lane by the lane trace assist control and the vehicle is traveling along a road in the traveling lane, an operation state determination unit configured to determine whether or not a driver of the vehicle is in a specific operation state in which the driver is releasing his or her hand from the steering wheel or is touching the steering wheel with his or her hand during activation of the lane trace assist control, an estimation unit configured to estimate a zero-point positional deviation amount of a sensor value of the steering torque sensor provided in the vehicle based on a center of an amplitude of the sensor value, when the traveling state determination unit determines that the vehicle is in the specific traveling state and the operation state determination unit determines that the driver is in the specific operation state, and a correction unit configured to correct at least one of the sensor value and a threshold value used in the predetermined determination process using the sensor value based on the deviation amount estimated by the estimation unit.

DESCRIPTION OF THE EMBODIMENTS

Description is now given of a correction device, a steering holding determination device, and a correction method according to at least one embodiment of the present disclosure with reference to the drawings.

<Hardware Configuration>

Figure 1:
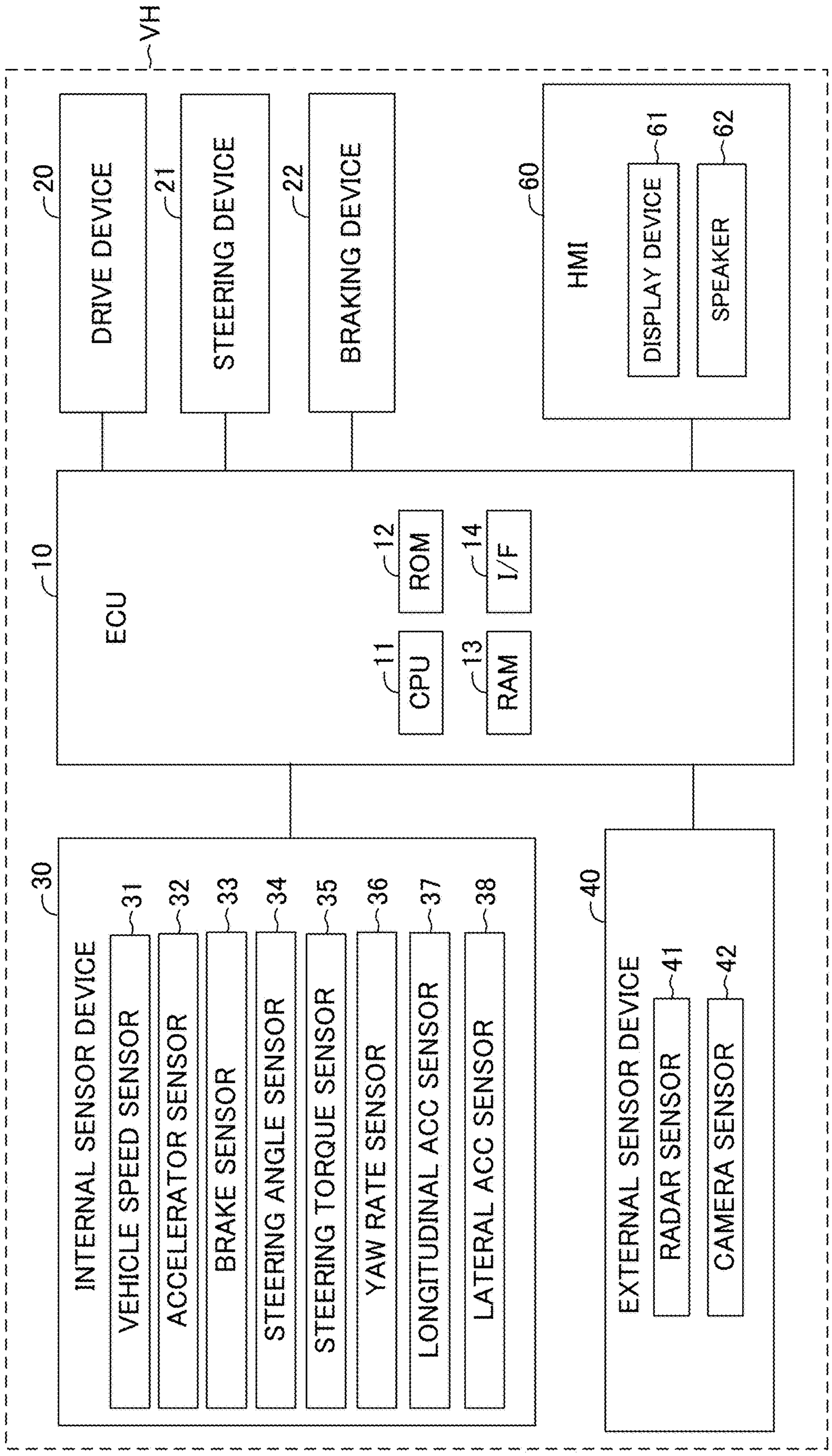
FIG. 1 is a schematic diagram of a hardware configuration of a vehicle to which the correction device and the steering holding determination device according to the present embodiment are applied.

FIG. 1 is a schematic diagram of a hardware configuration of a vehicle VH to which the correction device and the steering holding determination device according to the present embodiment are applied. Hereinafter, the vehicle VH may be referred to as an own vehicle when it is required to distinguish it from other vehicles.

The vehicle VH has an ECU (Electronic Control Unit) 10. The ECU 10 includes a CPU (Central Processing Unit) 11, ROM (Read Only Memory) 12, RAM (Random Access Memory) 13, an interface device 14, and the like. The CPU 11 executes various programs stored in the ROM 12. The ROM 12 is a non-volatile memory that stores data and the like required for the CPU 11 to execute various programs. The RAM 13 is a volatile memory to provide a working region that is deployed when various programs are executed by the CPU 11. The interface device 14 is a communication device for communicating with an external device.

The ECU 10 is a central device which executes a driving assistance control such as an Adaptive Cruise Control (ACC) and the Lane Trace Asist lane control (LTA). The driving assistance control is a concept which encompasses an automatic driving control. A drive device 20, a steering device 21, a braking device 22, an internal sensor device 30, an external sensor device 40, a HMI (Human Machine Interface) 60, and the like are communicably connected to the ECU 10.

The drive device 20 generates a driving force to be transmitted to driving wheels of the vehicle VH. As the drive device 20, for example, an engine and a motor are given. In the device according to the at least one embodiment, the vehicle VH may be any one of a hybrid electric vehicle (HEV), a plug-in hybrid electric vehicle (PHEV), a fuel cell electric vehicle (FCEV), a battery electric vehicle (BEV), and an engine vehicle. The steering device 21 applies steering forces to steerable wheels of the vehicle VH. The braking device 22 applies a braking force to the wheels of the vehicle VH.

The internal sensor device 30 is sensors which acquire states of the vehicle VH. Specifically, the internal sensor device 30 includes a vehicle speed sensor 31, an accelerator sensor 32, a brake sensor 33, a steering angle sensor 34, a steering torque sensor 35, a yaw rate sensor 36, a longitudinal acceleration sensor 37, a lateral acceleration sensor 38, and the like.

The vehicle speed sensor 31 detects a travel speed (vehicle speed) of the vehicle VH. The accelerator sensor 32 detects an operation amount of an accelerator pedal (not shown) by the driver. The brake sensor 33 detects an operation amount of a brake pedal (not shown) by the driver. The steering angle sensor 34 detects a rotational angle of a steering wheel or a steering shaft (not shown) of the vehicle VH, that is, a steering angle. The steering torque sensor 35 detects a rotational torque of a steering wheel or a steering shaft (not shown) of the vehicle VH, that is, a steering torque. The yaw rate sensor 36 detects a yaw rate of the vehicle VH. The longitudinal acceleration sensor 37 detects a longitudinal acceleration of the vehicle VH. The lateral acceleration sensor 38 detects an acceleration (lateral acceleration) of the vehicle VH in the vehicle widthwise direction. The internal sensor device 30 transmits the condition of the vehicle VH detected by the sensors 31 to 38 to the ECU 10 at a predetermined cycle.

The external sensor device 40 is sensors which acquire object information on objects around the vehicle VH. Specifically, the periphery recognition device 40 includes a radar sensor 41, a camera sensor 42, and the like. As the object information, there are given, for example, a peripheral vehicle, a pedestrian, a white line of a road, a falling object, and a stationary structure, and the like.

The radar sensor 41 detects a target object existing around the vehicle VH. The radar sensor 41 includes a millimeter wave radar or Lidar. The millimeter wave radar radiates a radio wave (millimeter wave) in a millimeter wave band, and receives the millimeter wave (reflected wave) reflected by a target object existing within a radiation range. The millimeter wave radar acquires a relative distance between the vehicle VH and the target object, a relative speed between the vehicle VH and the target object, and the like based on a phase difference between the transmitted millimeter wave and the received reflected wave, an attenuation level of the reflected wave, a time from the transmission of the millimeter wave to the reception of the reflected wave, and the like. The Lidar sequentially scans laser light in a pulse form having a shorter wavelength than that of the millimeter wave in a plurality of directions, and receives reflected light reflected by the target object, to thereby acquire a shape of the target object detected in front of the vehicle VH, the relative distance between the vehicle VH and the target object, the relative speed between the vehicle VH and the target object, and the like.

The camera sensor 42 captures an image of the surroundings of the vehicle VH and processes the captured image-data to acquire the target object information around the vehicle VH. As the camera sensor 42, for example, a digital camera having an image sensor such as a CMOS or a CCD can be used. The target object information is information indicating a type of a target object detected around the vehicle VH, a relative distance between the vehicle VH and the target object, a relative velocity between the vehicle VH and the target object, and the like. The type of the target object may be recognized by a machine learning such as a pattern matching, for example.

The external sensor device 40 repeatedly transmit the acquired object information to the ECU 10 each time a predetermined time elapses. The ECU 10 composes the relative relationship between the vehicle VH and the target object acquired by the radar sensor 41 and the relative relationship between the vehicle VH and the target object acquired by the camera sensor 42, to thereby determine a relative relationship between the vehicle VH and the target object. It is not always required for the external sensor device 40 to include both of the radar sensor 41 and the camera sensor 42, and may include, for example, only the radar sensor 41 or only the camera sensor 42.

The HMI 60 is an interface for inputting and outputting data between the ECU 10 and the drivers, and includes an input device and an output device. Examples of the input device include a touch panel, a switch, and a sound pickup microphone. Examples of the output device include a display device 61 and a speaker 62. The display device 61 is, for example, a center display installed in an instrument panel or the like, a multi-information display, a head-up display, a display of a navigation system, or the like.

<Software Configuration>

Figure 2:
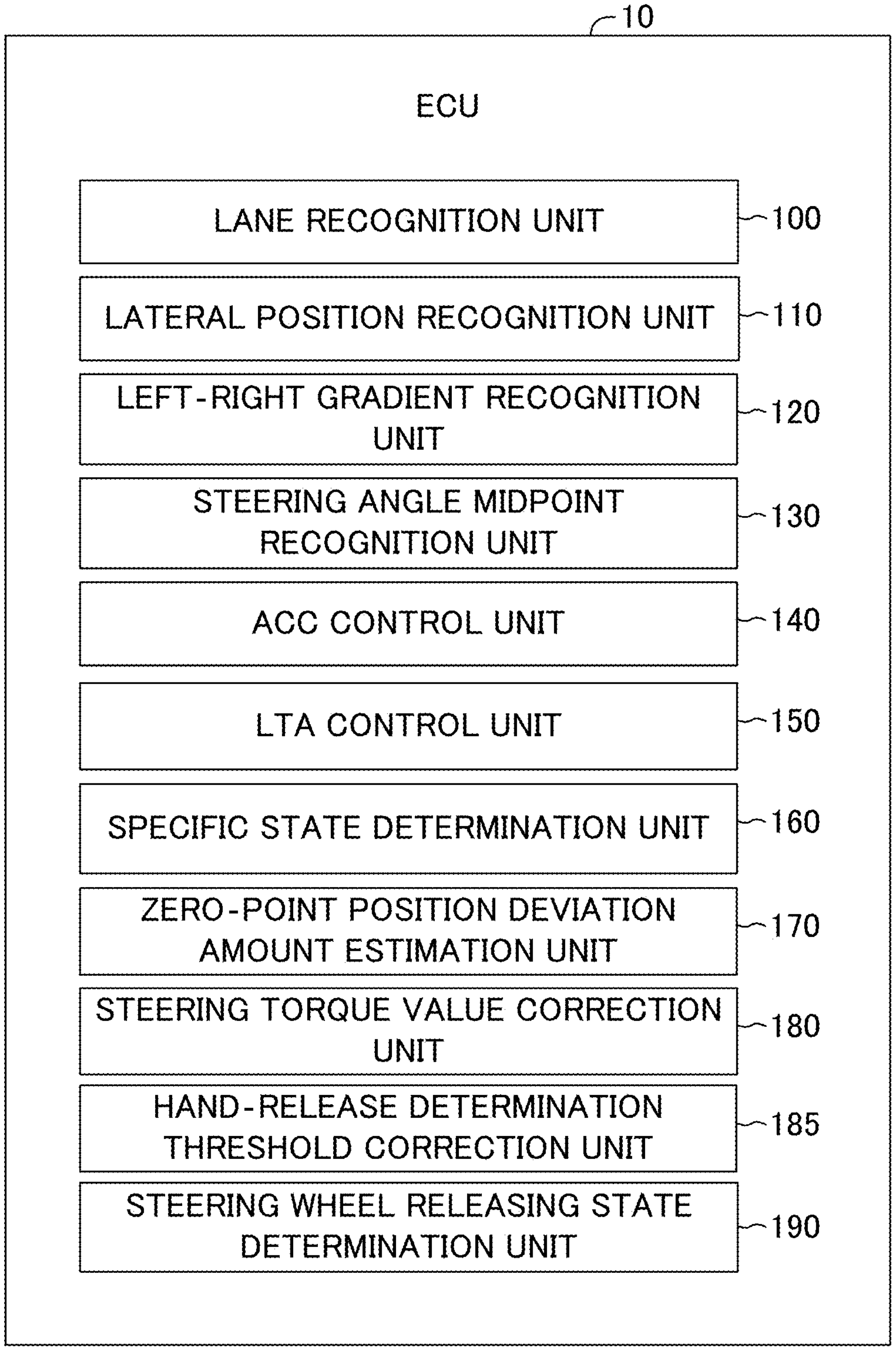
FIG. 2 is a schematic diagram showing a software configuration of a control device to the present embodiment.

FIG. 2 is a schematic diagram showing a software configuration of the ECU 10 to the present embodiment. As shown in FIG. 2, the ECU 10 includes a lane recognition unit 100, a lateral position recognition unit 110, a left-right gradient recognition unit 120, a steering angle midpoint recognition unit 130, an ACC control unit 140, a LTA control unit 150, a specific state determination unit 160, a zero-point position deviation amount estimation unit 170, a steering torque value correction unit 180, a hand-release determination threshold correction unit 185, a steering wheel releasing state determination unit 190, and the like as functional elements. Those functional elements 100 to 190 are described as being included in the ECU 10 which is integrated hardware, but any part thereof may be provided to an ECU independent of the ECU 10. Moreover, a part of the functional elements 100 to 190 of the ECU 10 may be provided to an external information processing device of a facility (for example, a managing center) which can communicate to and from the vehicle VH.

The lane recognizing unit 100 recognizes a lane (hereinafter, referred to as a traveling lane) in which the vehicle VH is traveling. The lane recognizing unit 100 recognizes a border line of the traveling lane, for example, on the basis of images or the like of the surroundings of the vehicle VH acquired by the external sensor device 40. Here, the boundary lines include not only white lines and yellow lines drawn on the road surface, but also curbstones, guardrails, and the like. The lane recognition unit 100 recognizes the traveling lane based on the recognized boundary line.

The lateral position recognizing unit 110 recognizes the lateral position of the vehicle VH based on the detection result of the external sensor device 40. Here, the lateral position of the vehicle VH is the lane width position of the own vehicle VH in the travel lane. The lateral position recognizing unit 110 recognizes the lateral position of the vehicle VH in the traveling lane based on the position of the vehicle VH with respect to the borderline of the traveling lane recognized by the lane recognizing unit 100.

The left-right gradient recognition unit 120 recognizes a gradient amount (hereinafter, referred to as a left-right gradient amount) in the lane width direction of the traveling lane recognized by the lane recognition unit 100. For example, the left-right gradient recognizing unit 120 calculates the lateral movement amount of the vehicle VH based on the detection results of the internal sensor device 30 and the external sensor device 40, and recognizes the left-right gradient amount of the traveling lane based on the calculated lateral movement amount.

The steering angle midpoint recognizing unit 130 recognizes a midpoint of a steering angle (hereinafter, referred to as a steering angle midpoint position) required for the vehicle VH to travel straight. The steering angle midpoint recognizing unit 130 calculates the lateral movement amount of the vehicle VH based on, for example, the detection results of the internal sensor device 30 and the external sensor device 40, and recognizes the steering angle midpoint position based on the calculated lateral movement amount.

The ACC control unit 140 executes the ACC based on the target vehicle speed or the target inter-vehicle distance. The ACC itself is well known. Thus, a brief description is now given of the ACC. The ACC includes two types of control, namely, the constant-speed travel control and the follow-up travel control. The constant-speed travel control is control of causing the vehicle VH to travel at a constant speed in accordance with the target vehicle speed. The follow-up travel control is control of causing the vehicle VH to travel such that the own vehicle VH follows the preceding vehicle traveling the traveling lane while maintaining the inter-vehicle distance to the preceding vehicle at the target inter-vehicle distance.

The ACC control unit 140 detects a following target vehicle (preceding vehicle) to be tracked in front of the own vehicle VH in the traveling lane recognized by the lane recognition unit 100, based on the detection result of the external sensor device 40. When the following target vehicle does not exist, the ACC control unit 140 executes constant-speed travel control. In this case, the ACC control unit 140 calculates the target acceleration from the deviation between the actual vehicle speed and the target vehicle speed detected by the vehicle speed sensor 31, and controls the operation of the drive device 20 and the braking device 22 based on the calculated target acceleration. The vehicle speed V may be acquired based on the detection result of the vehicle speed sensor 31. On the other hand, when the following target vehicle is present in the traveling lane, the ACC control unit 140 executes the follow-up travel control. In this case, the ACC control unit 140 calculates the target acceleration from the deviation between the actual inter-vehicle distance and the target inter-vehicle distance, and controls the operation of the drive device 20 and the braking device 22 based on the calculated target acceleration. The actual inter-vehicle distance between the own vehicle VH and the following target vehicle may be acquired based on the detection result of the external sensor device 40.

The LTA control unit 150 executes the LTA for automatically changing the steering angle (steered wheel turning angle) so that a lateral position of the own vehicle VH is maintained at the target lateral position in the traveling lane during the activation of the ACC. The LTA itself is well known. Thus, a brief description is now given of the LTA. The LTA control unit 150 sets the target lateral position of the own vehicle VH based on the border line of the traveling lane recognized by the lane recognizing unit 100. The target lateral position is set, for example, substantially at the center in the lane width direction of the traveling lane. The LTA control unit 150 changes the steering angle of the vehicle VH by controlling the operation of the steering device 21 so that the lateral position of the vehicle VH recognized by the lateral position recognizing unit 110 is maintained near the target lateral position in the own lane.

The specific state determination unit 160 determines whether or not the operating state of the drivers and the traveling state of the vehicle VH are in a specific state suitable for estimating the displacement of the zero-point position of the torque sensor value of the steering torque sensor 35, during the activation of the ACC. The specific state determination unit 160 is an example of a traveling state determination unit and an operating state determination unit of the present disclosure. For example, when all of the following first to third conditions are satisfied, the specific state determination unit 160 determines that the state is a specific state.

The first Condition: When the LTA is activating, the vehicle VH is traveling in a straight line and the lateral position of the vehicle VH is maintained near the target lateral position of the LTA.

The second Condition: The driver is releasing his or her hand from the steering wheel or keeping the steering wheel in touch with his or her hand.

The third Condition: When the vehicle VH is traveling along the road in the traveling lane.

The specific state determination unit 160 determines that the first condition is satisfied when the difference between the lateral position of the vehicle VH recognized by the lateral position recognition unit 110 and the target lateral position set by the LTA control unit 150 is within a predetermined threshold range (for example, ±20 cm). Further, the specific state determination unit 160 determines that the second condition is satisfied when the variation of the torque sensor value of the steering torque sensor 35 is within a predetermined threshold range (e.g., ±0.5 Nm). Further, the specific state determination unit 160 determines that the third condition is satisfied when the yaw rate, the yaw angle, and the lateral velocity of the vehicle VH are equal to or less than the predetermined value.

In addition to the first condition to the third condition, the specific state determination unit 160 may determine that the vehicle is in the specific state when the steering wheel is steered at a steering angle required for the driver to drive the vehicle VH along the road and the fourth condition that is not intentionally steered is satisfied. In this case, the specific state determination unit 160 may determine that the fourth condition is satisfied when the steering angle sensor value of the steering angle sensor 34 is in the vicinity of the steering angle value considering the steering angle midpoint deviation due to the alignment deviation of the vehicle VH or in the vicinity of the steering angle value considering the steering angle adjustment by the left-right gradient of the traveling lane. The steering angle midpoint may be acquired based on the recognition result of the steering angle midpoint recognition unit 130, and the left-right gradient amount of the traveling lane may be acquired based on the recognition result of the left-right gradient recognition unit 120.

The zero-point position deviation amount estimation unit 170 estimates a deviation amount (hereinafter, referred to as a zero-point positional deviation amount $\Delta T$) from the center point (0 Nm) of the zero-point position of the torque sensor value of the steering torque sensor 35. The zero-point positional deviation amount estimation unit 170 estimates the zero-point positional deviation amount $\Delta T$ by estimating a value (a DC component) that is the center of the amplitude of the torque sensor value of the steering torque sensor 35 when the specific state determination unit 160 determines that it is in the specific state. For example, the zero-point positional deviation amount estimation unit 170 estimates a value that is the center of the amplitude of the torque sensor value based on any one of the following first to third methods.

Figure 3:
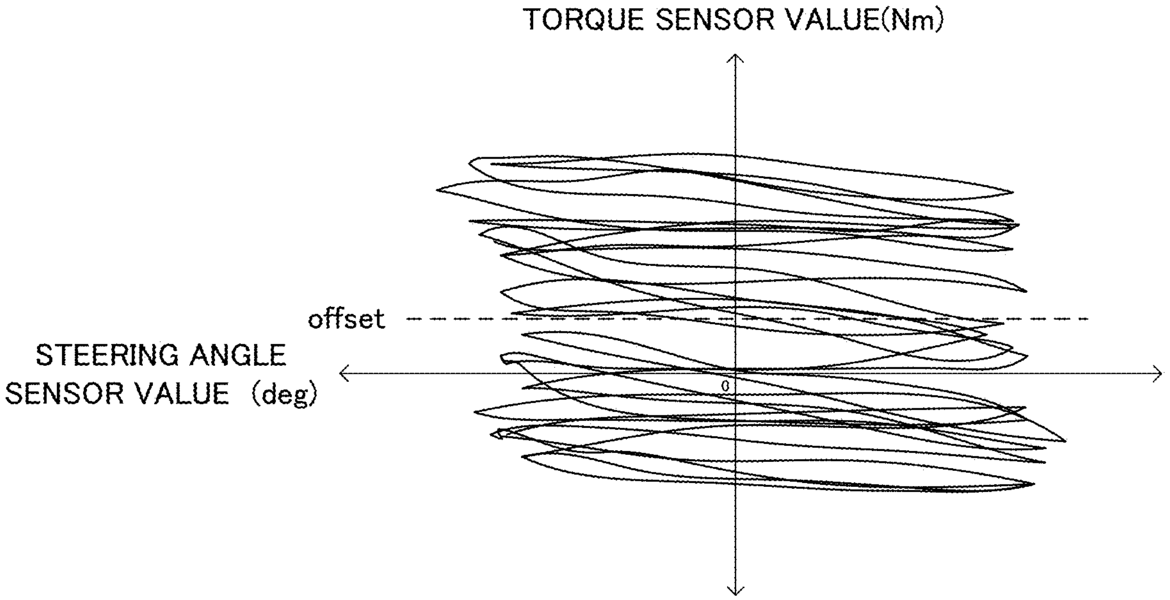
FIG. 3 is a schematic diagram of a Lissajous waveform in which a vertical axis represents a torque sensor value and a horizontal axis represents a steering angle sensor value.

The first method: The center point of the torque sensor value is specified from the torque sensor value of the steering torque sensor 35 and a Lissajous waveform of the steering angle sensor value of the steering angle sensor 34. FIG. 3 is a schematic diagram of the Lissajous waveform in which a vertical axis represents the torque sensor value and a horizontal axis represents the steering angle sensor value. In the first method, the zero-point positional deviation amount estimation unit 170 estimates the offset (refer to the broken line in FIG. 3) from the center point (0 Nm) of the torque sensor value as the zero-point positional deviation amount ΔT.

The Second method: An average value of the torque sensor values of the steering torque sensor 35 in a predetermined period is obtained, and the average value is estimated as a zero-point positional deviation amount ΔT of the torque sensor value.

The third method: The maximum value and the minimum value of the torque sensor value of the steering torque sensor 35 in a predetermined period are specified, and the center point of the maximum value and the minimum value is estimated as the zero-point positional deviation amount ΔT of the torque sensor value.

The zero-point positional deviation amount estimation unit 170 estimates the zero-point positional deviation amount ΔT based on any one of the first method to the third method, and stores the estimated zero-point positional deviation amount ΔT in a nonvolatile memory such as the ROM 12. The zero point position deviation amount estimating unit 170, when the estimated zero point position deviation amount ΔT (absolute value) exceeds a predetermined upper limit threshold $T_{Max}$, does not store the value. That is, a guard is provided for preventing erroneous learning in a case where a non-normal value is estimated due to an influence of disturbance or the like. The upper limit threshold $T_{Max}$ is not particularly limited, but may be set based on, for example, an upper limit assumed as an assembly error of the steering torque sensor 35.

Figure 4A:
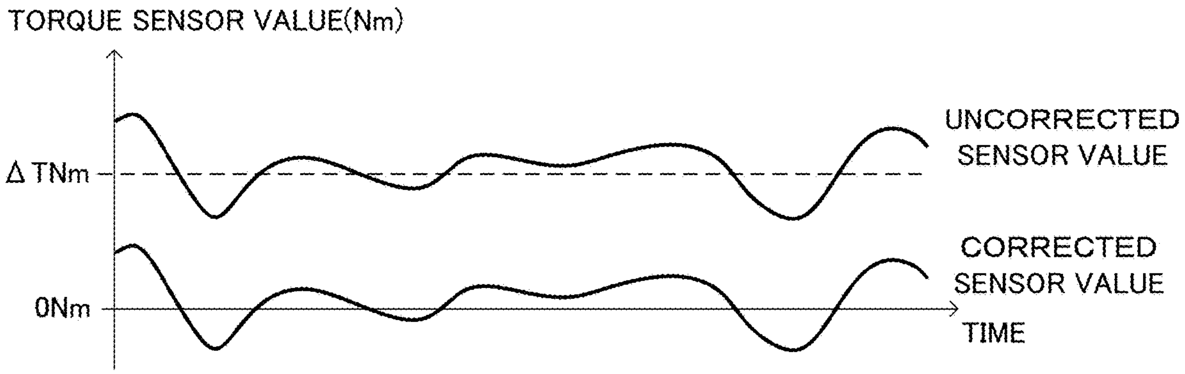
FIG. 4A is a schematic diagram illustrating a specific example of the correction process according to the present embodiment.

The steering torque value correction unit 180 is an example of the correction unit of the present disclosure, and corrects the torque sensor value of the steering torque sensor 35 based on the zero-point position deviation amount ΔT estimated by the zero-point position deviation amount estimation unit 170. Specifically, as shown in the FIG. 4A, when the zero-point positional deviation amount ΔT is a positive value, the steering torque value correction unit 180 executes correction by subtracting the zero-point positional deviation amount ΔT (absolute value) from the torque sensor value. Further, when the zero-point positional deviation amount ΔT is a negative value, the steering torque value correction unit 180 executes correction by adding the zero-point positional deviation amount ΔT (absolute value) to the torque sensor value.

The hand-release determination threshold correction unit 185 is an example of the correction unit of the present disclosure, and corrects the torque determination threshold (upper limit value and lower limit value) used in the hand-release determination process based on the zero-point positional deviation amount ΔT estimated by the zero-point positional deviation amount estimation unit 170. Specifically, as shown in the FIG. 4B, when the zero-point positional deviation amount ΔT is a positive value, the hand-release determination threshold correction unit 185 executes the correction by adding the zero-point positional deviation amount ΔT (absolute value) to the torque determination threshold value (upper limit value, lower limit value). Further, when the zero-point positional deviation amount ΔT is a negative value, the hand-release determination threshold correction unit 185 executes the correction by subtracting the zero-point positional deviation amount ΔT (absolute value) from the torque determination threshold value (upper limit value, lower limit value).

The steering wheel releasing state determination unit 190 determines whether or not the driver is in a steering wheel releasing state in which the driver is releasing his or her hand from the steering wheel based on the torque determination threshold value (upper limit value and lower limit value). The steering wheel releasing state determination unit 190 determines that the driver is in the steering wheel releasing state, when the torque sensor value of the steering torque sensor 35 is within the range of the torque determination threshold (upper limit value, lower limit value). The steering wheel releasing state determination unit 190 transmits a command to warn the driver to the display device 61 or the speaker 62, when determines the steering wheel releasing state.

Figure 4B:
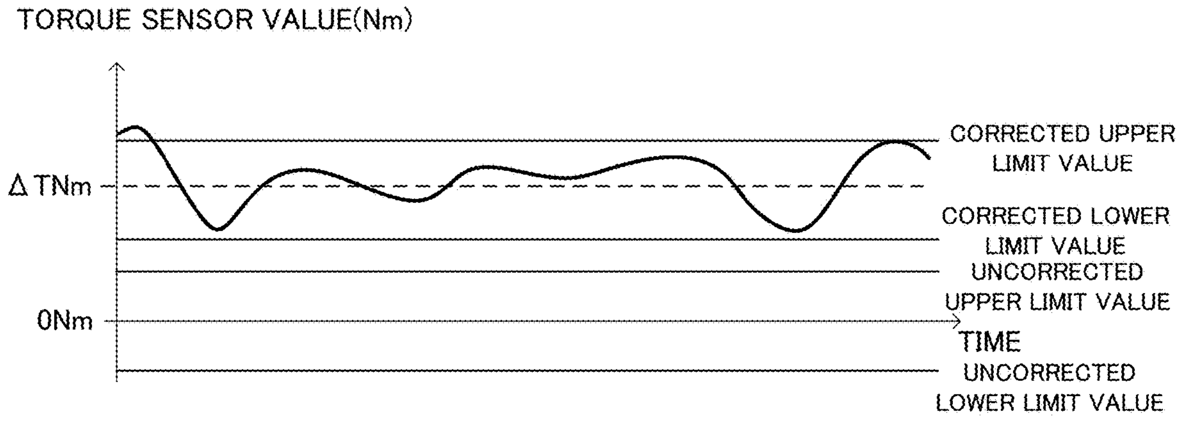
FIG. 4B is a schematic diagram illustrating a specific example of the correction process according to the present embodiment.

In the present embodiment, the steering wheel releasing state determination unit 190 performs the steering wheel releasing determination based on the correction torque determination threshold (upper limit value, lower limit value) shown in the FIG. 4B, which is corrected by the zero-point positional deviation amount ΔT. Accordingly, it is possible to realize highly accurate determination based on the corrected torque determination threshold considering the influence of individual differences and assembly errors of the steering torque sensor 35. That is, it is possible to reliably improve the accuracy of the steering wheel releasing determination. Note that the steering wheel releasing state determination unit 190 may perform the steering wheel releasing determination using the corrected torque sensor value shown in the FIG. 4A corrected by the steering torque value correction unit 180. In this case, the steering wheel releasing determination may be performed by comparing the torque determination threshold value (upper limit value, lower limit value) that has not been corrected with the corrected torque sensor value.

Figure 5:
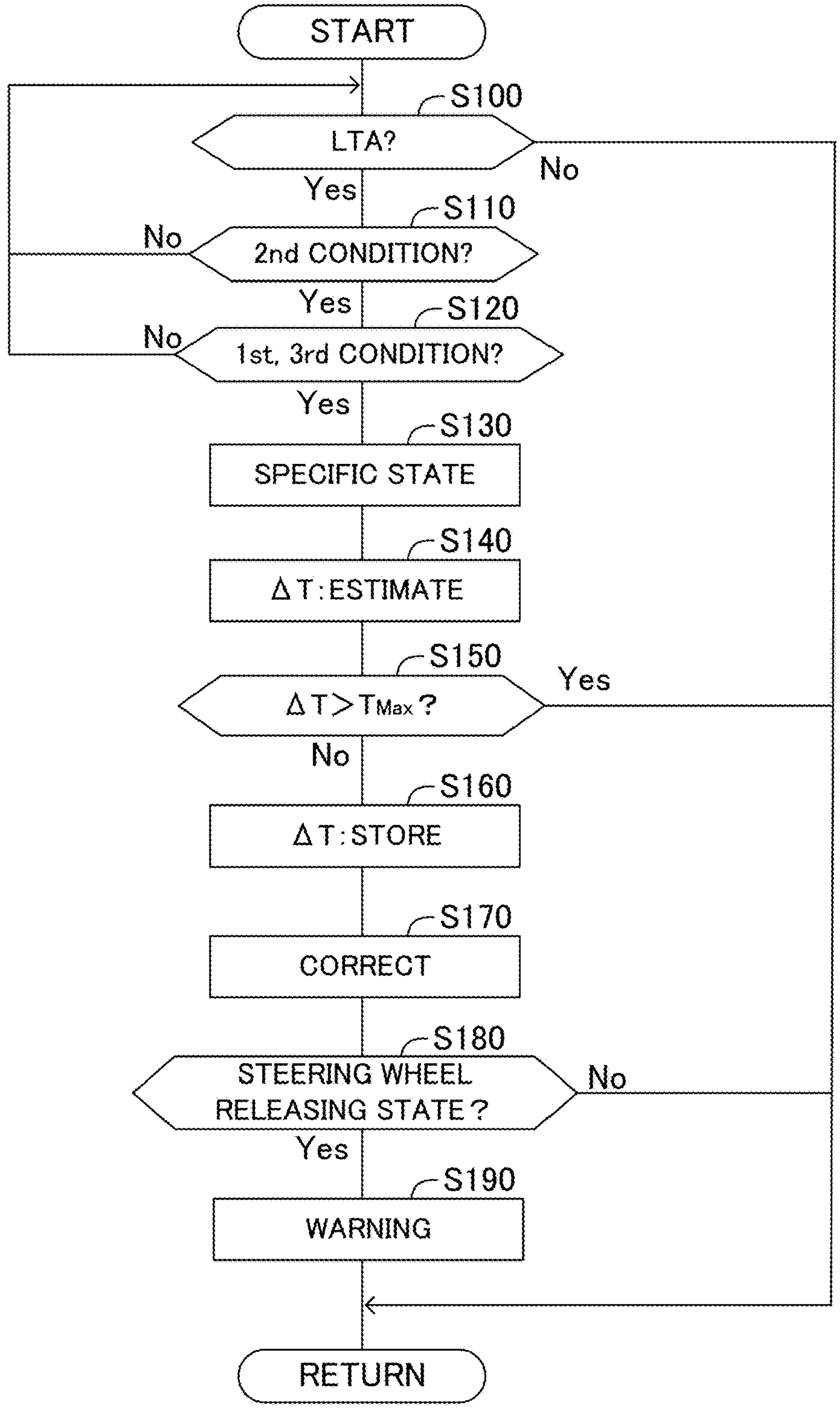
FIG. 5 is a flowchart for explaining a routine of an estimation process, a correction process, and a determination process according to the present embodiment.

FIG. 5 is a flowchart for explaining the routine of the estimation process, the correction the and process, determination process by the CPU 11 of the ECU 10. This routine is started, for example, when the vehicle VH travels.

In step S100, the ECU 10 determines whether the LTA is activated. If the LTA is activated (Yes), the ECU 10 advances the process to step S110. On the other hand, if the LTA is not activated (No), the ECU 10 returns this routine.

In step S110, the ECU 10 determines whether the driver entrust to the LTA, that is, whether the driver is releasing his or her hand from the steering wheel, or whether the second condition is satisfied in which the steering wheel is held to the extent that he or she is touching the steering wheel with his or her hand. If the second condition is satisfied (Yes), the ECU 10 advances the process to step S120. On the other hand, if the second condition is not satisfied (No), the ECU 10 returns the process to step S100.

In step S120, the ECU 10 determines whether or not the vehicle VH is traveling in the vicinity of the target lateral position by the LTA. That is, the ECU 10 determines whether or not the first condition that the vehicle VH is traveling in a straight line during the operation of the LTA and the lateral position of the vehicle VH can be maintained in the vicinity of the target lateral position of the LTA, and the third condition that the vehicle VH is traveling along the road in the traveling lane are satisfied. When both the first condition and the third condition are satisfied (Yes), the ECU 10 advances the process to step S130. On the other hand, if at least one of the first condition and the third condition is not satisfied (No), the ECU 10 returns the process to step S100. Note that the process of step S110 and step S120 is not sequential, and may be performed simultaneously.

In the step S130, the ECU 10 determines that the operation state of the driver and the traveling state of the vehicle VH are in a specific state suitable for estimating the zero-point positional deviation amount ΔT of the torque sensor value. Next, in step S140, the ECU 10 estimates the zero-point positional deviation amount ΔT of the torque sensor value by estimating a value that is the center of the amplitude of the torque sensor value based on any one of the first to third methods described above.

In the step S150, the ECU 10 determines whether or not the absolute value of the zero-point positional deviation amount ΔT estimated in step S140 exceeds the upper limit threshold $T_{Max}$. If the absolute value of the zero-point positional deviation amount ΔT does not exceed the upper limit threshold $T_{Max}$ (No), the ECU 10 advances the process to step S160. On the other hand, if the absolute value of the zero-point positional deviation amount ΔT exceeds the upper limit threshold $T_{Max}$ (Yes), the ECU 10 returns this routine.

In the step S160, the ECU 10 stores the zero-point positional deviation amount ΔT estimated in the step S140 in the nonvolatile memory such as the ROM 12. Next, in step S170, the ECU 10 corrects the torque sensor value of the steering torque sensor 35 and/or the torque determination threshold value (upper limit value, lower limit value) used for the steering wheel releasing determination based on the stored zero-point positional deviation amount ΔT.

In step S180, the ECU 10 determines whether the driver is in the steering wheel releasing state. If the torque determination threshold value (upper limit value, lower limit value) is used, the ECU 10 determines that the driver is in the steering wheel releasing state when the torque sensor value of the steering torque sensor 35 is within the torque determination threshold value (upper limit value, lower limit value). If the correction torque sensor value is used, the ECU 10 determines that the driver is in the steering wheel releasing state when the corrected torque sensor value is within the torque determination threshold value (upper limit value, lower limit value) that is not corrected. If it is determined that the driver is in the steering wheel releasing state (Yes), the ECU 10 advances the process to step S190 to execute the warning by the display device 61 and/or the speaker 62, and returns this routine. On the other hand, if it is determined that the driver is not in the steering wheel releasing state (No), the ECU 10 returns this routine without executing the alert.

In the above, the correction device, the steering holding determination device, and the correction method according to the at least one embodiment have been described, but the present disclosure is not limited to the above-mentioned at least one embodiment, and various modifications are possible within the range not departing from the object of the present disclosure.

For example, in the above embodiment, the ECU 10 determines that the operating state of the driver and the traveling state of the vehicle VH are in the specific state suitable for estimating the zero-point positional deviation amount ΔT of the torque sensor value when all of the first condition to the third condition are satisfied, but may determine that the driving state and the traveling state are in the specific state when any one or two of the first condition to the third condition are satisfied. Further, in the above embodiment, the ECU 10 has been described as performing the steering wheel releasing determination based on the correction torque sensor value or the corrected torque determination threshold (upper limit value, lower limit value), but may be configured to perform other determination processes other than the steering wheel releasing determination based on the torque sensor value.

What is claimed is:

1. A correction device for a steering torque sensor, comprising:

a traveling state determination unit configured to determine whether or not, during activation of a lane trace assist control for maintaining a vehicle in a traveling lane in which the vehicle is traveling, the vehicle is in a specific traveling state in which the lateral position of the vehicle is maintained near a predetermined target lateral position set in the traveling lane by the lane trace assist control and the vehicle is traveling along a road in the traveling lane;

an operation state determination unit configured to determine whether or not a driver of the vehicle is in a specific operation state in which the driver is releasing his or her hand from the steering wheel or is touching the steering wheel with his or her hand during activation of the lane trace assist control;

an estimation unit configured to estimate a zero-point positional deviation amount of a sensor value of the steering torque sensor provided in the vehicle based on a center of an amplitude of the sensor value, when the traveling state determination unit determines that the vehicle is in the specific traveling state and the operation state determination unit determines that the driver is in the specific operation state; and a correction unit configured to correct at least one of the sensor value and a threshold value used in the predetermined determination process using the sensor value based on the deviation amount estimated by the estimation unit, wherein the correction unit is configured to:

execute the correction only when (1) the traveling state determination unit determines that the vehicle is in the specific traveling state and (2) the operation state determination unit determines that the driver is in the specific operation state, and inhibit the correction when (3) the traveling state determination unit does not determine that the vehicle is in the specific traveling state or (4) when the operation state determination unit does not determine that the driver is in the specific operation state.

2. The correction device for a steering torque sensor according to claim 1, wherein the correction unit does not execute the correction of the sensor value or the threshold value based on the deviation amount when the deviation amount estimated by the estimation unit exceeds a predetermined upper threshold value.

3. The correction device for a steering torque sensor according to claim 1, wherein the traveling state determination unit configured to determines that the vehicle is in the specific traveling state when the lateral position of the vehicle is maintained near the center position of the traveling lane set as a target lateral position and the vehicle is traveling along the road in the travelling lane in an abbreviated straight line state.

4. A steering holding determination device comprising the correction device according to claim 1, comprising:

a steering wheel releasing state determination unit configured to determine that the driver of the vehicle is in a steering wheel releasing state in which the driver is releasing his or her hands from the steering wheel when the sensor value is within a predetermined lower to upper determination threshold value range, wherein the steering wheel releasing state determination unit is configured to determines that the driver is in the steering wheel releasing state when the correction unit corrects the sensor value based on the deviation amount and the corrected sensor value is within the range of the lower determination threshold value to the upper determination threshold value; and wherein the steering wheel releasing state determination unit is configured to determines that the driver is in the steering wheel releasing state when the correction unit corrects both the lower determination threshold value and the upper determination threshold value based on the deviation amount and the sensor value is within the range of the corrected lower threshold value to the upper threshold value.

5. A correction method for a steering torque sensor comprising the steps of:

determining whether or not, during activation of a lane trace assist control for maintaining a vehicle in a traveling lane in which the vehicle is traveling, the vehicle is in a specific traveling state in which the lateral position of the vehicle is maintained near a predetermined target lateral position set in the traveling lane by the lane trace assist control and the vehicle is traveling along a road in the traveling lane;

determining whether or not a driver of the vehicle is in a specific operation state in which the driver is releasing his or her hand from the steering wheel or is touching the steering wheel with his or her hand during activation of the lane trace assist control;

estimating a zero-point positional deviation amount of a sensor value of the steering torque sensor provided in the vehicle based on a center of an amplitude of the sensor value, when determining that the vehicle is in the specific traveling state and the driver is in the specific operation state; and correcting at least one of the sensor value and a threshold value used in the predetermined determination process using the sensor value based on the estimated deviation amount, wherein correcting comprises:

executing the correction only when (1) the traveling state determination unit determines that the vehicle is in the specific traveling state and (2) the operation state determination unit determines that the driver is in the specific operation state, and inhibiting the correction when (3) the traveling state determination unit does not determine that the vehicle is in the specific traveling state or (4) when the operation state determination unit does not determine that the driver is in the specific operation state.

6. The correction device for a steering torque sensor according to claim 1, wherein the estimation unit is configured to estimate the zero-point positional deviation amount based on a Lissajous waveform in which a vertical axis represents the sensor value of the steering torque sensor and a horizontal axis represents a steering angle sensor value of a steering angle sensor provided in the vehicle.

7. The correction device for a steering torque sensor according to claim 1, further comprising a nonvolatile memory, wherein the estimation unit is configured to store the estimated zero-point positional deviation amount in the nonvolatile memory.

8. The correction device for a steering torque sensor according to claim 1, wherein the traveling state determination unit is configured to determine that the vehicle is in the specific traveling state when a difference between the lateral position of the vehicle and the predetermined target lateral position set in the traveling lane by the lane trace assist control is within a predetermined threshold range.

9. The correction device for a steering torque sensor according to claim 1, wherein the operation state determination unit is configured to determine that the driver is in the specific operation state when a variation of the sensor value of the steering torque sensor is within a predetermined threshold range.

10. The correction method for a steering torque sensor according to claim 5, wherein estimating the zero-point positional deviation amount comprises estimating the zero-point positional deviation amount based on a Lissajous waveform in which a vertical axis represents the sensor value of the steering torque sensor and a horizontal axis represents a steering angle sensor value of a steering angle sensor provided in the vehicle.

11. The correction method for a steering torque sensor according to claim 5, further comprising storing the estimated zero-point positional deviation amount in a nonvolatile memory.

12. The correction method for a steering torque sensor according to claim 5, wherein determining that the vehicle is in the specific traveling state comprises determining that a difference between the lateral position of the vehicle and the predetermined target lateral position set in the traveling lane by the lane trace assist control is within a predetermined threshold range.

13. The correction method for a steering torque sensor according to claim 5, wherein determining that the driver is in the specific operation state comprises determining that a variation of the sensor value of the steering torque sensor is within a predetermined threshold range.

* * * * *